US009127975B2

(12) United States Patent      (10) Patent No.: US 9,127,975 B2
Jordan      (45) Date of Patent: Sep. 8, 2015

(54) APPARATUS AND METHODS FOR WATER WASTE MANAGEMENT IN WATER DISTRIBUTION SYSTEMS

(76) Inventor: Fergus Jordan, Montanare di Cortono (IT)

( * ) Notice: Subject to any disclaimer, the term of this patent is extended or adjusted under 35 U.S.C. 154(b) by 478 days.

(21) Appl. No.: 13/515,421

(22) PCT Filed: Dec. 11, 2010

(86) PCT No.: PCT/EP2010/069432
§ 371 (c)(1),
(2), (4) Date: Jul. 25, 2012

(87) PCT Pub. No.: WO2011/088933
PCT Pub. Date: Jul. 28, 2011

(65) Prior Publication Data
US 2012/0279315 A1    Nov. 8, 2012

(30) Foreign Application Priority Data
Dec. 13, 2009    (EP) ..................................... 09178994

(51) Int. Cl.
*G01F 1/66*      (2006.01)
(52) U.S. Cl.
CPC ....................... *G01F 1/666* (2013.01)
(58) Field of Classification Search
CPC ......................................................... G01F 1/66
USPC .............. 73/861.18, 861.23, 861.28
See application file for complete search history.

(56) References Cited

U.S. PATENT DOCUMENTS

| 4,462,264 | A | * | 7/1984 | Feller | 73/861.18 |
| 4,470,040 | A | * | 9/1984 | Kaminishi | 340/566 |
| 4,736,763 | A | * | 4/1988 | Britton et al. | 137/10 |
| 5,243,327 | A | | 9/1993 | Bentz et al. | |
| 7,367,239 | B2 | * | 5/2008 | Engel | 73/861.18 |
| 8,336,393 | B2 | * | 12/2012 | Davis et al. | 73/861.18 |
| 2005/0011278 | A1 | * | 1/2005 | Brown et al. | 73/861.18 |
| 2007/0001028 | A1 | * | 1/2007 | Gysling | 239/318 |
| 2007/0044572 | A1 | * | 3/2007 | Davis et al. | 73/861.42 |
| 2008/0309503 | A1 | * | 12/2008 | White et al. | 340/606 |
| 2009/0260438 | A1 | * | 10/2009 | Hedtke | 73/579 |
| 2010/0114072 | A1 | * | 5/2010 | Iordanov et al. | 604/890.1 |
| 2011/0203387 | A1 | * | 8/2011 | Davis et al. | 73/861.18 |

FOREIGN PATENT DOCUMENTS

WO    WO2005/015135 A2    2/2005

OTHER PUBLICATIONS

International Search Report dated May 18, 2011, application No. PCT/EP2010/069432.

\* cited by examiner

*Primary Examiner* — Hezron E Williams
*Assistant Examiner* — Hoang Nguyen
(74) *Attorney, Agent, or Firm* — RatnerPrestia

(57) ABSTRACT

The present invention discloses a non invasive and mobile device to detect and quantify water consumption in domestic or public water systems, wherein detection is achieved by a piezoelectric device.

9 Claims, 6 Drawing Sheets

PZ-03

PZ-02

PZ-01

PZ-03

PZ-02

PZ-01

APPARATUS AND METHODS FOR WATER WASTE MANAGEMENT IN WATER DISTRIBUTION SYSTEMS

CROSS REFERENCE TO RELATED APPLICATION

This application is the U.S. National Phase application of PCT International Application No. PCT/EP2010/069432, filed Dec. 11, 2010, and claims priority to European Patent Application No. 09178994.1, filed Dec. 13, 2009, the disclosures of each of which being incorporated herein by reference in their entireties.

FIELD OF THE INVENTION

The present invention aims at reducing waste of water by increasing the awareness of water flow in water distribution systems in various areas such as domestic, office, institutional or recreational areas.

BRIEF DESCRIPTION OF RELATED ART

Many systems for monitoring fluid flow in water pipes have been developed, but very few can be operated without intercepting the flow. They can be based on various physical principles such as for example: mechanical flow meters, pressure-based meters, optical flow meters, acoustic Doppler velocimetry, thermal mass flow meters, vortex flowmeters, electromagnetic, ultrasonic and Coriolis flow meters, Laser Doppler flow measurement.

Most systems based on mechanical flow meters or pressure-based meters are invasive and therefore not suitable for the present invention.

Optical and electromagnetic systems are less invasive but they are used mostly with gas. Small particles which accompany gases pass through two laser beams focused on a pipe by illuminating optics. Laser light is scattered when a particle crosses the first beam. The detecting optics collects scattered light on a photodetector, which then generates a pulse signal. If the same particle crosses the second beam, the detecting optics collects scattered light on a second photodetector, which converts the incoming light into a second electrical pulse. By measuring the time interval between these two pulses, the flow velocity is calculated as V=D/T where D is the distance between the laser beams and T is the time interval between the two pulses.

Sensors based on ultrasonic velocity difference measurement use elastic waves to monitor the speed of the liquid flowing through a given pipe. Ultrasonic flow meters work with at least two different types of physical principles:

Transmission flowmeters for measuring transit time.
Doppler Reflection flowmeters.

The transit-time flowmeters measure the time of flight difference between an ultrasonic pulse sent in the flow direction and an ultrasonic pulse sent opposite the flow direction. Measurements can be adversely affected by impurities in the moving fluid such as for example gas and solid contents.

They have two opposing transducers outside the pipe, one for measuring the time of a signal sent from a transducer upstream to a transducer downstream and the other for measuring the time in the opposite direction.

Doppler meters use the frequency shift of an ultrasonic signal when it is reflected by impurities suspended in the moving fluid. The relative motions are determined by measuring the frequency shift between the ultrasonic frequency source, the receiver, and the fluid carrier. This method requires the presence of reflecting particles in the moving fluid and is therefore not suitable for clear liquids. It also requires that the fluid be transported in clear pipes.

These non intrusive methods are difficult and costly to realise and require complex electronic systems.

Acoustic flow sensors such as described in U.S. Pat. No. 4,462,264 include a cylindrical wall defining a fluid-flow passage, a flow-metering rotor supported in the passage set in rotation by flowing fluid, an electric signal generator including piezoelectric transducer means cooperating with the rotor for producing an electric signal representative of the flow. Said method is complex and invasive.

Another class of systems that has been used in the detection of leaks is based on piezoelectricity.

For example U.S. Pat. No. 4,736,763 discloses a pipe flow detector for detecting unwanted fluid flow and for automatically triggering means for shutting off said unwanted flow. The detector comprises a piezoelectric film transducer attached to the pipe. Said transducer produces an electric signal in response to pipe vibration. The signal is then sent to a complex series of amplifiers and filters in order to identify a leak and then interrupt water flow.

There is thus still a need for a simple, non invasive and cost effective device capable of faithfully informing the user about water consumption. Such a device could rapidly gain universal acceptance due its to low cost and ease of implementation in existing pipework and taps. The present invention can therefore materially affect the objective of greatly reducing water waste and associated energy waste and as a direct consequence reduce Global Warming.

SUMMARY OF THE INVENTION

It is an objective of the present invention to use a piezoelectric device to detect and quantify fluid flow in a pipe or tap.

It is another objective of the present invention to provide a device which effectively reduces water consumption.

It is also an objective of the present invention to provide a device that does not reduce the water pressure.

It is yet another objective of the present invention to provide a device that does not cut off the water flow.

It is a further objective of the present invention to provide a device that allows the user to control water saving.

It is yet a further objective of the present invention to provide a device that is not invasive, is easily movable and does not require alteration of the water distribution system.

In accordance with the present invention, the foregoing objectives are realised as described in the independent claims. Preferred embodiments are described in the dependent claims.

DETAILED DESCRIPTION OF THE INVENTION

Accordingly, the present invention discloses an apparatus releasably affixed to a pipe or tap in a domestic water supply and designed to detect and quantify water flow in said water supply in order to inform the end user of water consumption and wherein said apparatus comprises a piezoelectric device.

The present system is light, easy to place or remove and does not require any modification of the water distribution system. It can be placed on any pipe or tap and can be relocated to another position at any time, if and when desired.

A pipe or tap is a mechanical system that presents some features typical of solid bodies, among which, the normal modes of oscillations. Any rigid body can be set in motion by an external solicitation even if its centre of mass velocity and all the angular velocities are null. This motion consists in oscillations that are typical of the specific body under consideration. The amplitude of the normal modes increases proportionally to the magnitude of external stimulation, whereas the frequencies depend on the material and geometry of the pipe or tap.

It is thus an objective of the present invention to monitor the pipe or tap oscillations in the presence and in the absence of water flow. When the water is running inside a pipe or tap, a small fraction of its kinetic energy is transferred to the pipe thereby inducing small amplitude oscillations according its normal modes.

The present inventors have observed that water flow through pipes or taps is capable of activating oscillations in a broad range of frequencies irrespective of material and geometry. Typical frequencies used in the examples were of the order of 1 kHz, but any spectral bandwidth may be covered by the present invention. For taps, the vibrations induced by the water flow are measured directly in the proximity of said tap.

The present method is based on the measurement of medium to high frequency vibration amplitude in the pipe or tap system in order to discriminate between the presence or absence of water flow. The root mean square amplitude (rms) of the vibration is used to monitor the energy transfer due to the water flow as represented in table I.

TABLE I

| Tap condition | Rms value (arbitrary units) |
|---|---|
| Closed (no flow) | 150 |
| Open (small flow) | 200 |
| Open (moderate flow) | 290 |
| Widely open (large flow) | 360 |

The rms value of the vibration amplitude varies significantly and progressively with the flow intensity, regulated by the opening of the tap. It increases with increasing water flow.

Figure 1:
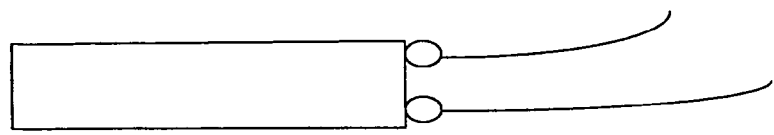
FIG. 1 represents several types of piezoelectric sensors that can be used in the present invention.
Figure 1:
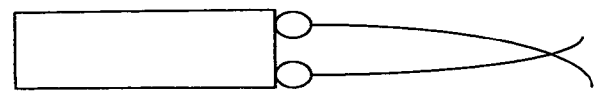
Figure 1:
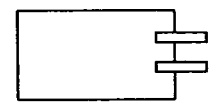

The piezoelectric devices or strips used in the present invention are parallelepiped pieces of piezoelectric material that develop a voltage difference across the material when it is subjected to a mechanical stress or strain. Examples of such devices are represented in FIG. 1.

The use of the piezoelectric devices or strips as flow monitors presents remarkable advantages:
- piezoelectric strips can be realised in various materials and geometries and can thus be easily adapted to different situations;
- piezoelectric devices or strips can be miniaturised;
- piezoelectric strips can be produced in large scale at moderate cost;
- the rms value of the amplitude can be measured with standard electronics that is easily implemented with moderate cost.
- a multiplexing/demultiplexing component can be added when the piezoelectric device is used for several roles.

The sensor is part of a water saving device that is releasably affixed to a tap, or to a pipe, or to a hose, or to a tube leading to a showerhead. The device can be effectively affixed to pipes, taps, hoses, and showerheads made from various materials including, but not limited to, metal, plastic, rubber or combinations thereof.

Figure 2:
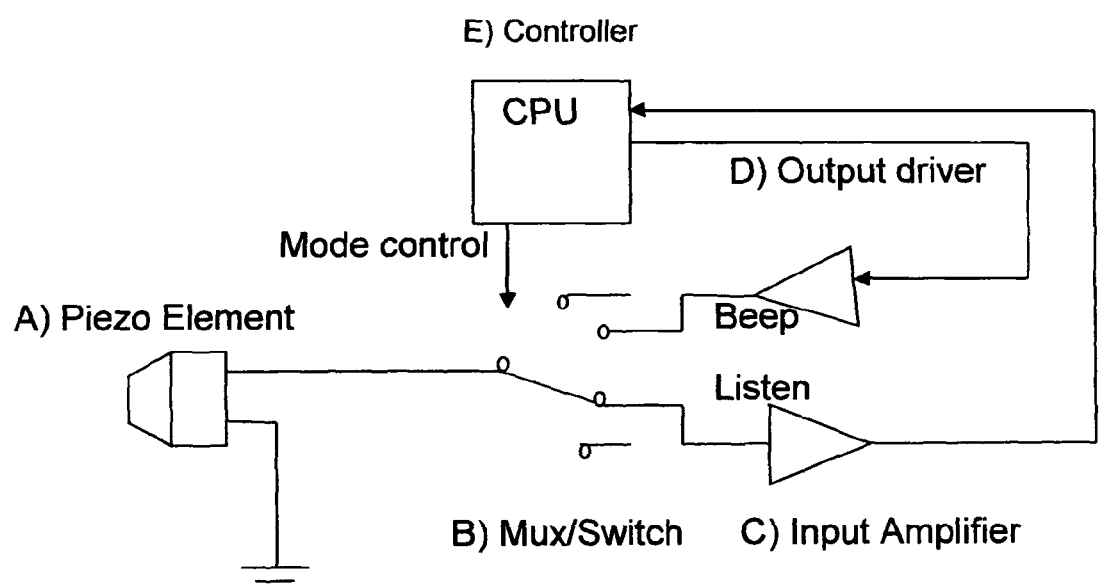
FIG. 2 represents a water saving device in accordance with aspects of the present invention.

The water saving device of the present invention comprises:
1. a piezoelectric sensor;
2. an externally powered electronic amplifier connected to the piezoelectric sensor;
3. a timer connected to the amplifier;
4. a signal generating device connected to the timer;

wherein all units, are in the same casing or in any combination between two or three separate casings and wherein the water saving device is optionally wired to cause the piezoelectric device to act both as sensor and as signal generating device, as represented in FIG. 2.

In the preferred embodiment according to the present invention, the piezielectric device acts both as sensor and as signal generator. A multiplexing/demultiplexing component is then added to the piezoelectric device.

The externally powered electronic amplifier is used to transform the low voltage electric signal, of the order of one mV, emitted by the piezoelectric device into a useable signal, of the order of at least one volt. It may optionally include a band-pass filter.

The timer, connected to the amplifier is triggered at the onset of water flow. It can be pre-set to a defined time limit T. The time interval T after which a signal is emitted can be set by the user at will or the device can be purchased with several pre-set options, depending upon its final use. It can be for example a short period of time for a bathroom sink or a longer period of time for a showerhead hose.

The signal generating device is connected to the timer and is designed to emit a signal an interval of time T, as determined by the timer, after the onset of water flow. The signal generating device can be selected from:
- a sound signal with constant intensity.
- a sound signal wherein the intensity is adjusted to increase with increasing time, similarly to the 'fasten seat belt' signal in cars.
- a light signal with constant intensity, or a multi-colour light signal or flashing light signal or a combination thereof.
- a system including an automatic switch-off device.
- a system including a remote control device such as for example infrared light (IR) that is typically used for remote control of televisions and hi-fi systems.
- a vibration or other signal perceivable by deaf and/or blind users
- a combination of any one or more of these signals.

After the signal is sent-off, the device can be set either to be silenced or to continue at a constant mode or to continue with an increasingly aggressive mode.

The real aim of the water saving device is therefore awareness of water consumption.

If wanted, it can further be easily adjusted to save water in various uses such as for example brushing teeth, watering garden, shower, washing hands. As the present system is flexible, light and easy to insert, it can be fitted to all water uses, from the smallest, such as washing hands, to more important, such as shower, and still more important such as watering crops.

The device can thus be pre-fitted with any preset time interval of water flow for use in different situations or locations. The preset time intervals can be implemented either in a single device or in different 'single time' devices. Various situations such as brushing teeth, shower, hand washing or other can thus be accurately monitored using the appropriate preset time interval.

The device of the present invention combines several technical advantages:
  It is non-invasive and non-obstructive and requires neither modification of the water distribution system nor interception of the water flow.
  It has an efficiency of over 95% on taps or pipes of different geometries and materials.
  It requires low power and can be operated continuously for at least one year.
  It can be manufactured with low cost standard components.
  It is easy to operate.
  It is easily removed in order to be re-used and/or placed at another location.

The present invention also discloses a method for preparing a water saving device that comprises the steps of:
  a) providing a piezoelectric sensor;
  b) connecting an externally powered electronic amplifier to the sensor;
  c) connecting a timer to the amplifier;
  d) connecting a signal emitting device to the timer
  e) inserting all components in a single or separate casing(s) equipped with releasable fastening means The casing may be a smooth 'half moon' shaped clear transparent water coloured 'bubble' which will be hygienic while not interfering with chrome or brass feature design of fittings. The bubble may contain its component in a visible form or within a design or a logo. Alternatively, the 'bubble' may be embellished on the surface or below the skin with a feature such as for example a design or a logo or a colour. Alternatively, the components may be organised in separate casings able to communicate to each other.

The fastening means may include velcro strips, snaps or magnets.

The present invention also discloses a method for reducing waste of water in a water distribution system that comprises the steps of:
  a) retrieving the electric current emitted by a piezoelectric device, acting as sensor, in response to the onset and magnitude of water flow in a water distribution system;
  b) amplifying the currents of step a) with an externally powered electronic amplifier;
  c) sending the amplified current of step b) to feed a timer;
  d) connecting the timer of step c) to a signal emitting device;
  e) triggering a signal after a pre-selected time delay determined by the end use of water flow.

The piezoelectric device can optionally act both as sensor in step a) and as signal emitting device in step e).

The present invention further discloses the use of the present water saving device for warning about water consumption, for preserving the environment through water and energy saving and for reducing the home water bills.

The present invention allows effective preservation of water resources and environment without the negative effect of decreasing the water pressure or shutting off water. It also allows maximum flexibility in determining how much and where water should be saved.

EXAMPLES

A number of different pipes or taps under different flow conditions were tested.

Figure 3:
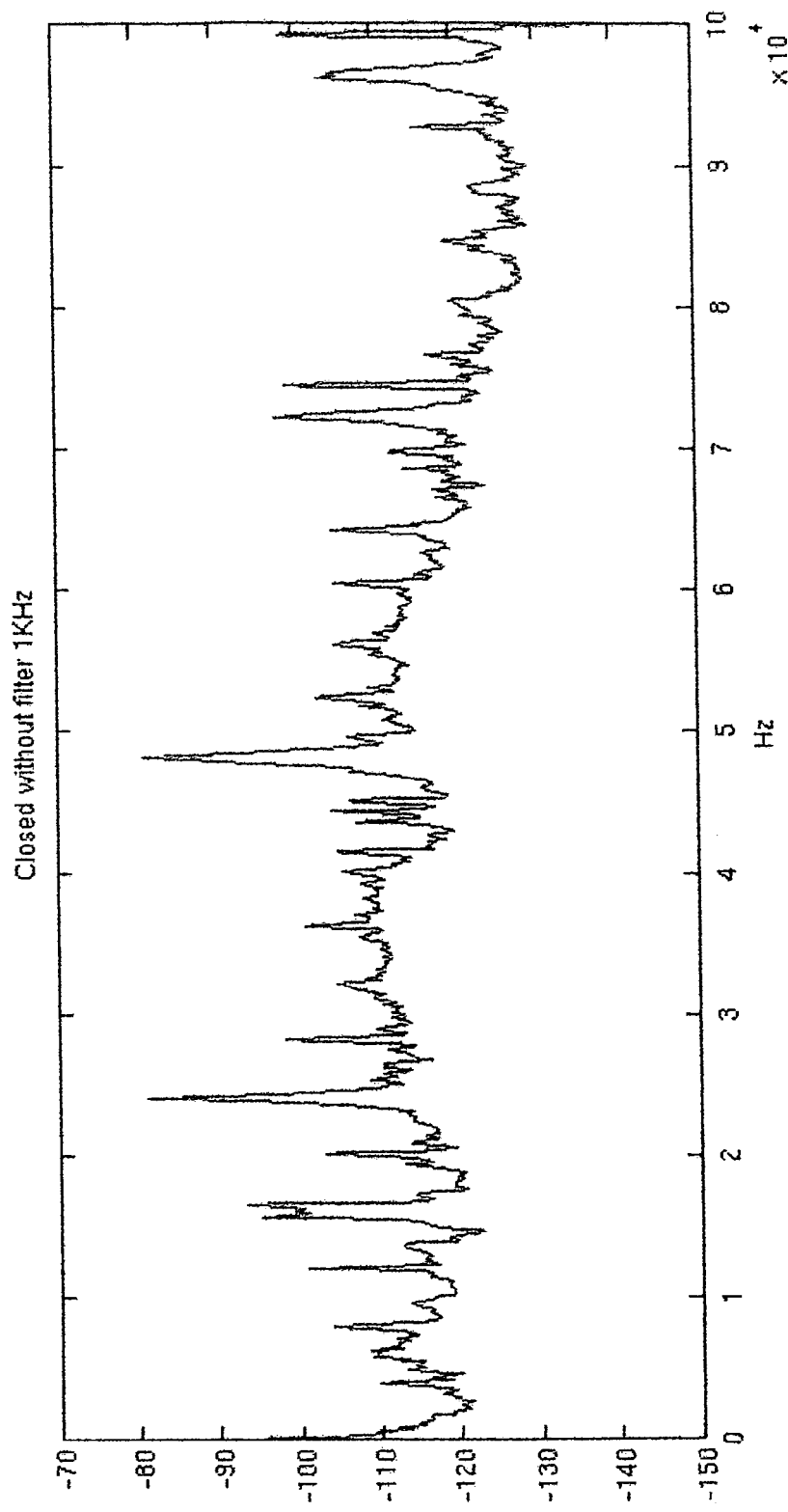
FIG. 3 represents the unfiltered power spectral density expressed in dB as a function of frequency expressed in $10^4$ Hz for a metallic tap in the absence of water flow.

FIG. 3 represents the unfiltered power spectral densities of vibrations present in a common metallic tap in the absence of water flow. It presents a number of peaks that are typical of the normal modes of the solid body under consideration. The vibrations were measured directly on the pipe in the proximity of the tap.

Figure 4:
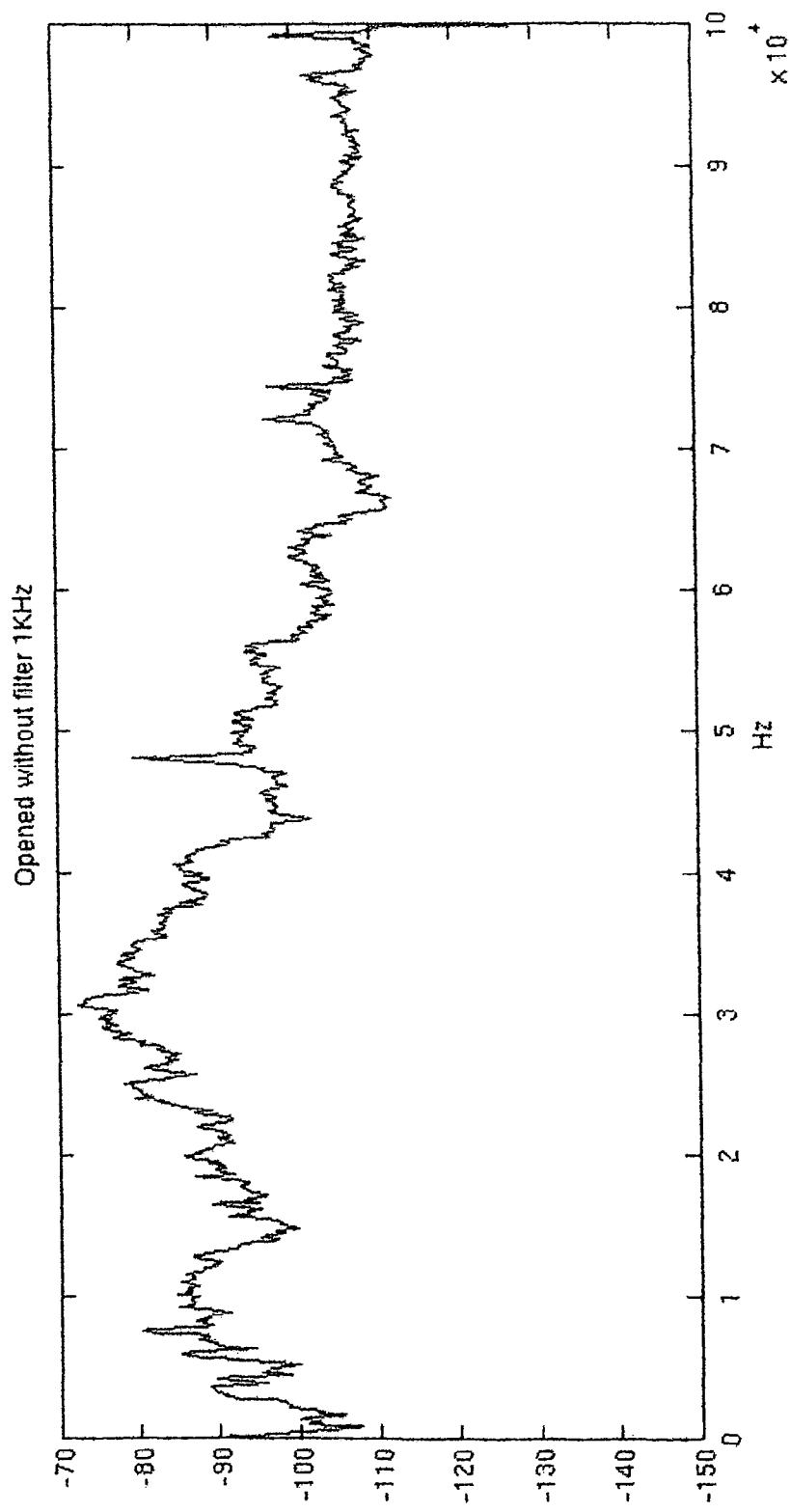
FIG. 4 represents the unfiltered power spectral density expressed in dB as a function of frequency expressed in $10^4$ Hz for a metallic tap in the presence of a moderate water flow.

FIG. 4 represents the unfiltered power spectral density of the same tap as that of FIG. 3 during a moderate water flow. In this figure the peak structure was still present, such as for example the resonant peak at about 48 KHz, but a large energy 'bump' was observed in the spectrum between 20 and 40 KHz.

Accidental perturbations of the tap operation were avoided by repeating the same measurements with a high pass filter. Effects possibly introduced by standard operations and human movements close to the tap could thereby be suppressed.

Figure 5:
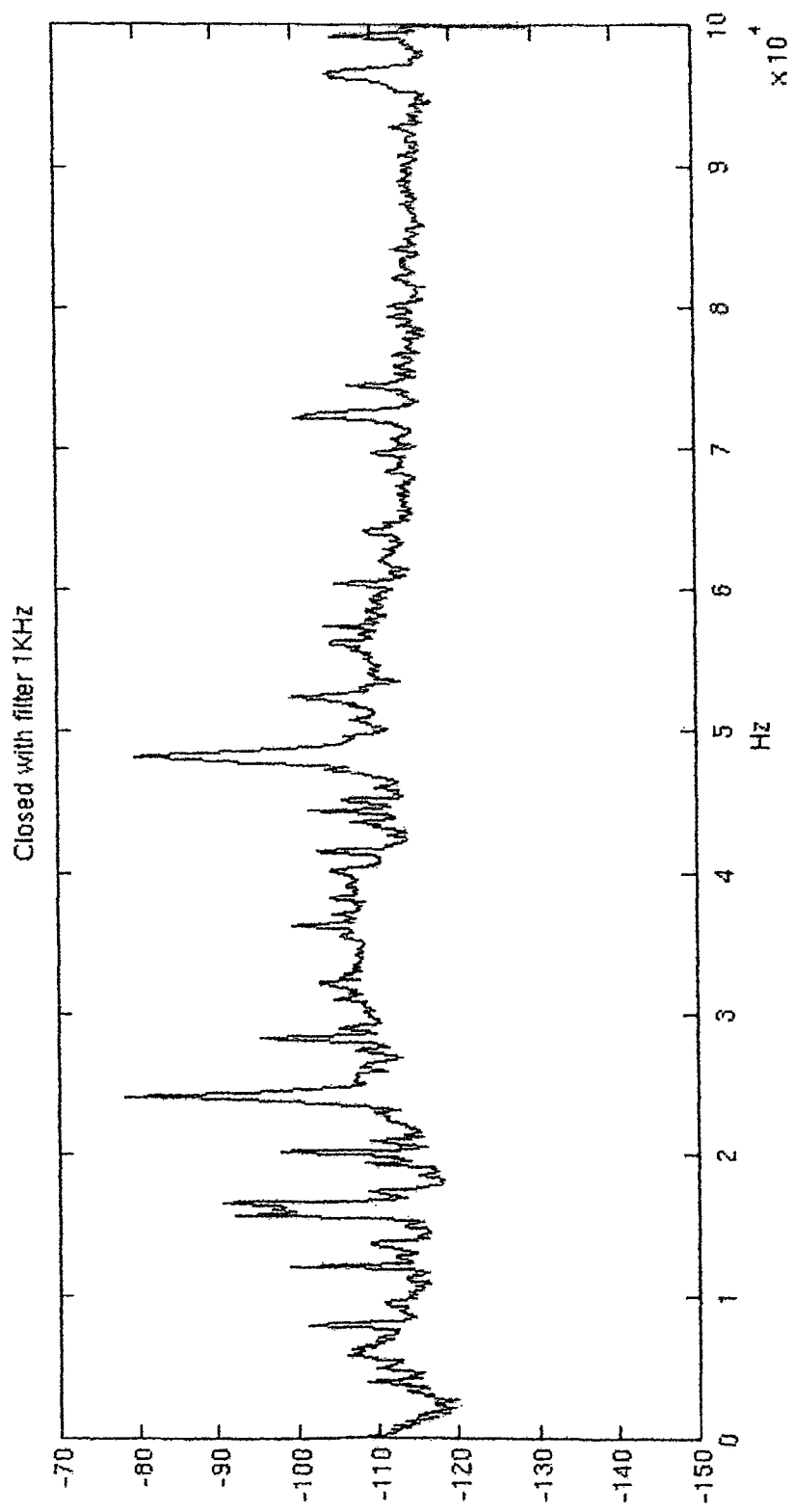
FIG. 5 represents the filtered power spectral density expressed in dB as a function of frequency expressed in $10^4$ Hz for a metallic tap in the absence of water flow and wherein the filter is a high pass filter set at 1 kHz.
Figure 6:
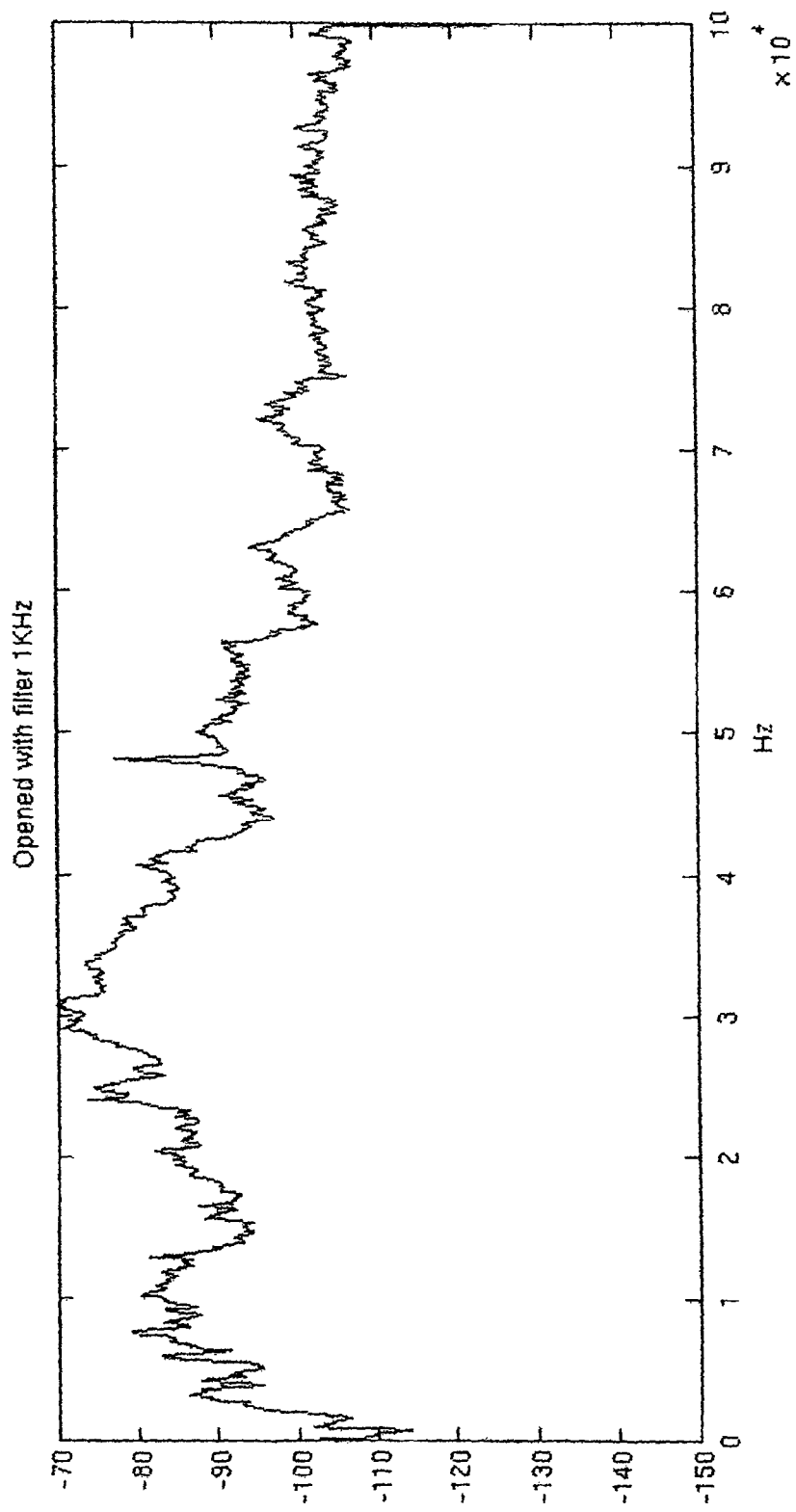
FIG. 6 represents the filtered power spectral density expressed in dB as a function of frequency expressed in $10^4$ Hz for a metallic tap in the presence of a moderate water flow and wherein the filter is a high pass filter set at 1 kHz.

FIGS. 5 and 6 represent respectively the filtered power spectral densities of the same tap as that of FIGS. 3 and 4 in the absence of water flow and during a moderate water flow. The data were filtered with a standard high pass filter set at 1 KHz.

Comparing FIGS. 5 and 6 it was observed that the 'bump' structure in the spectrum was present only when the tap was in the open position, thereby showing a clear signature of energy transfer from the water flow to the tap.

The measurement of high frequency vibration amplitude in the pipe/tap system was then used in order to discriminate between the presence or absence of water flow. The measurement of the root mean square amplitude (rms) of the vibration time signal was selected to monitor the energy transfer due to the water flow. They are summarised in Table II.

TABLE II

| Tap condition | Rms value (mV) |
| --- | --- |
| Closed (no flow) | 0.750 +/− 0.005 |
| Open (small flow) | 0.900 +/− 0.005 |
| Open (moderate flow) | 1.300 +/− 0.005 |
| Widely open (large flow) | 1.600 +/− 0.005 |

It was observed that the rms value of the vibration amplitude varies significantly by a factor of about 2.5 between closed and widely open tap.

When the piezoelectric device is used both as sensor and as beeper, it can for example be switched to sensor mode for 10 s every 30 s, and then switched to beeper mode for 10 s every 30 s, with a 5 s separation between sensor and beeper modes.

The invention claimed is:
1. An apparatus suitable for being releasably affixed to a pipe or tap in a domestic water supply and designed to detect and quantify water flow in said water supply in order to inform an end user of water consumption and wherein said apparatus comprises a piezoelectric device, an externally powered electronic amplifier, a timer and a signal generator and wherein the piezoelectric device is configured to act both as sensor and as signal generator.

2. The apparatus of claim 1, wherein the piezoelectric device acts both as a sensor and a signal generator and wherein said apparatus also comprises a multiplexing/demultiplexing component.

3. The apparatus of claim 1 wherein the externally powered amplifier transforms a low voltage electric signal emitted by the piezoelectric device into a useable signal.

4. The apparatus of claim 3 wherein the signal is used to trigger the timer, itself serially connected to the signal generator.

5. The apparatus of claim 1 wherein the timer has a pre-set time limit.

6. The apparatus of anyone of claim 1 wherein the timer can be set and modified by the user.

7. The apparatus of claim 1, wherein the signal generated by the signal emitting device is a sound either continuous or increasing with increasing time.

8. A method for reducing waste of water in a water distribution system that comprises the steps of:
   a) retrieving electric current emitted by a piezoelectric device, acting as a sensor, in response to an onset and magnitude of water flow in a water distribution system;
   b) amplifying the current of step a) with an externally powered electronic amplifier;
   c) sending the amplified current of step b) to feed a timer;
   d) connecting the timer of step c) to a signal emitting device;
   e) triggering a signal after a pre-selected time delay determined by an end use of water flow.

9. The method of claim 8 wherein the piezoelectric device is acting both as the sensor in step a) and as a signal generator in step e).

* * * * *